UNITED STATES PATENT OFFICE.

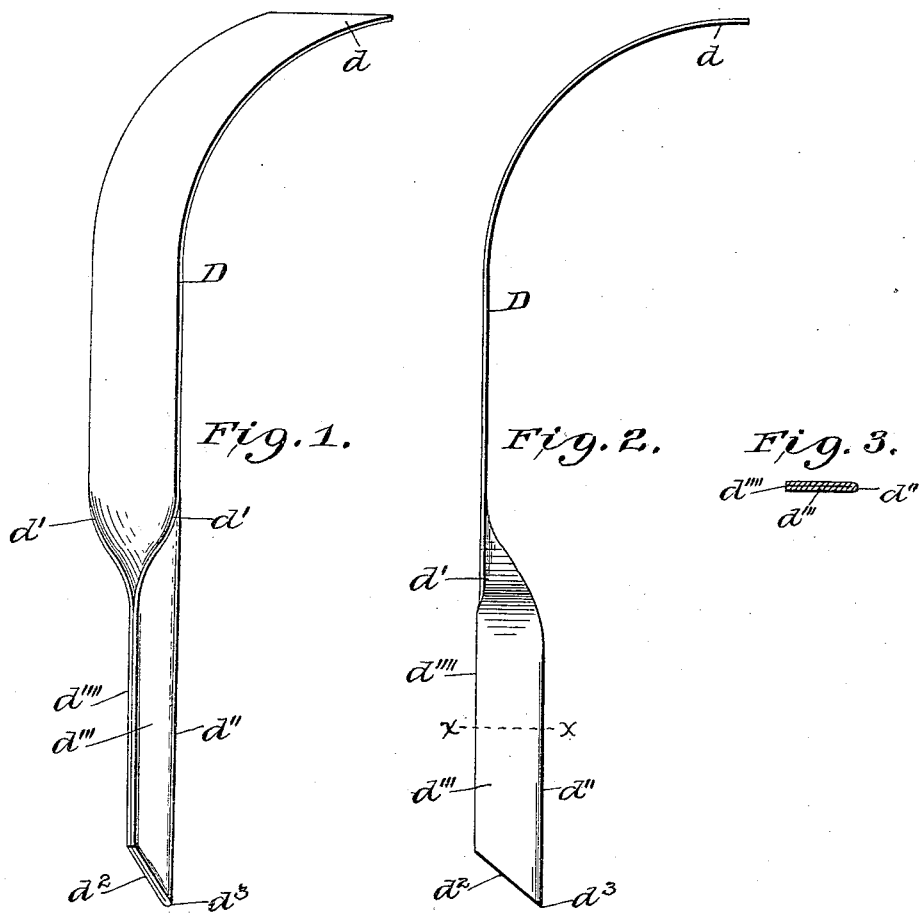

GEORGE BENNETT DAVISON, OF UTICA, NEW YORK.

WEEDER-TOOTH.

SPECIFICATION forming part of Letters Patent No. 632,962, dated September 12, 1899.

Application filed July 11, 1899. Serial No. 723,433. (No model.)

*To all whom it may concern:*

Be it known that I, GEORGE BENNETT DAVISON, a citizen of the United States, residing at Utica, in the county of Oneida and State of New York, have invented certain new and useful Improvements in Weeder-Teeth; and I do hereby declare the following to be a full, clear, and exact description of the invention, such as will enable others skilled in the art to which it appertains to make and use the same.

My invention relates to weeder-teeth, and has for its objects to provide an exceedingly strong spring-tooth for weeding purposes, one that will pass through the soil easily, will effectually loosen and uproot the weeds without injury to the plants or their roots, and will not catch in the plants nor become clogged with the weeds.

It is necessary that a weeder-tooth in order to accomplish well its purpose should be strong and flexible and that the soil-engaging portion be made so as to present but a slight contact-surface to the soil, so as not to injure the roots of the plants and not catch in and carry with it the tendrils and branches of the plants nor the uprooted weeds. To these ends the tooth is usually made long and slender and preferably of some spring material—as, for instance, spring-steel. In most of such teeth, however, in striving to attain the above objects the teeth are made too weak and present too great an engaging surface to the soil to enable it to pass through the same with the ease desired. I am aware that heretofore teeth for weeders and harrows have been made round and V-shaped in cross-section at their soil-engaging portions; but these forms of teeth lack several advantages possessed by the teeth constituting my present invention, as will be hereinafter more fully set forth. Teeth having the lower weeding part made tubular in form are liable to buckle or bend under strain, and they present more surface to the soil than is desirable.

My invention is illustrated in the accompanying drawings, in which—

Figure 1 is a perspective view of the tooth; Fig. 2, a side view, and Fig. 3 a sectional view on line $x$ $x$ of Fig. 2.

The flexibility and spring yielding action of the tooth is obtained in my invention by making the upper part $d$ of the tooth flat and curved like the upper part of the ordinary spring harrow-tooth. A short distance below its center the edges of the tooth are bent back to form wings $d'$, which are then bent backward from the middle of the tooth and pressed or stamped flatly upon each other, so as to form a slightly-rounded front edge $d''$, flat straight sides $d'''$, and a sharp rear edge $d''''$. The part of the tooth thus formed extends to the lower end and is adapted to engage the soil. The bottom edge $d^2$ of the tooth is inclined from the front to the rear, as shown, and forms a central soil engaging and cutting point $d^3$.

The upper part of the tooth may be modified slightly without departing from the principle of my invention; but the flat spring form of the upper part is preferable for the purposes of flexibility, cheapness, ease of manufacture in connection with the lower part of the tooth, and convenience of attachment to the weeder-frame.

It will be seen that the weeder-tooth above described will, while possessing the desired flexibility, yet in its soil-engaging part have the desired strength and sufficient rigidity and stiffness to pass easily through the soil and readily loosen the weeds therefrom. The slightly-rounded front edge of the tooth prevents injury to the plants, yet presents no obstruction to the free passage of the flat sides. While the soil-engaging portion has the desirable stiffness above set forth, it also possesses a sidewise flexibility due to its flat sides and spring upper portion that enables it to yield laterally on contact with plants, trees, or other objects, which is an advantage not possessed by the teeth of tubular and other forms heretofore referred to.

Having thus described my invention, what I claim is—

1. A weeder-tooth having a spring upper portion and bent at its lower portion into a flat soil-engaging part extending to the end of the tooth, thereby presenting a small weeding edge to the soil, substantially as described.

2. A spring weeder-tooth having a flat upper shank and having its lower longitudinal edges bent back and forming wings which are pressed flat upon each other so as to form a soil-engaging portion of said tooth, substantially as described.

3. A weeder-tooth having a spring upper portion and having its lower longitudinal edges extending to the end of the tooth, bent back against each other forming a front, rounded weeding edge and straight, flat sides, substantially as described.

4. A weeder-tooth having a spring upper portion and having its lower longitudinal edges bent back against each other to form a flat soil-engaging portion, the bottom edge of the tooth inclined so as to form with the front edge a central cutting-point at the end of the tooth, substantially as described.

In testimony whereof I affix my signature in presence of two witnesses.

GEORGE BENNETT DAVISON.

Witnesses:
W. I. SCOTT,
FRED GIBSON.